N. Cross,
Camp Bed,
No. 37,153.  Patented Dec. 16, 1862
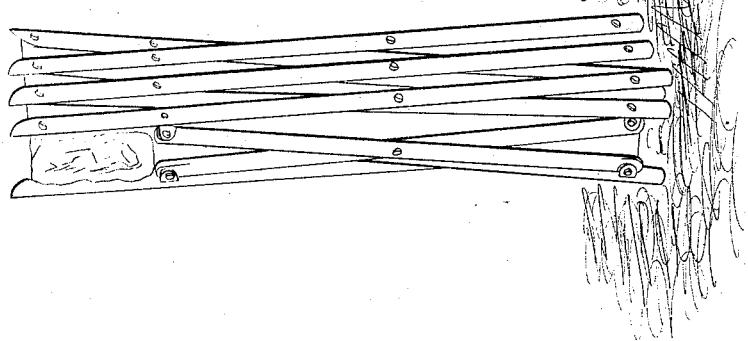
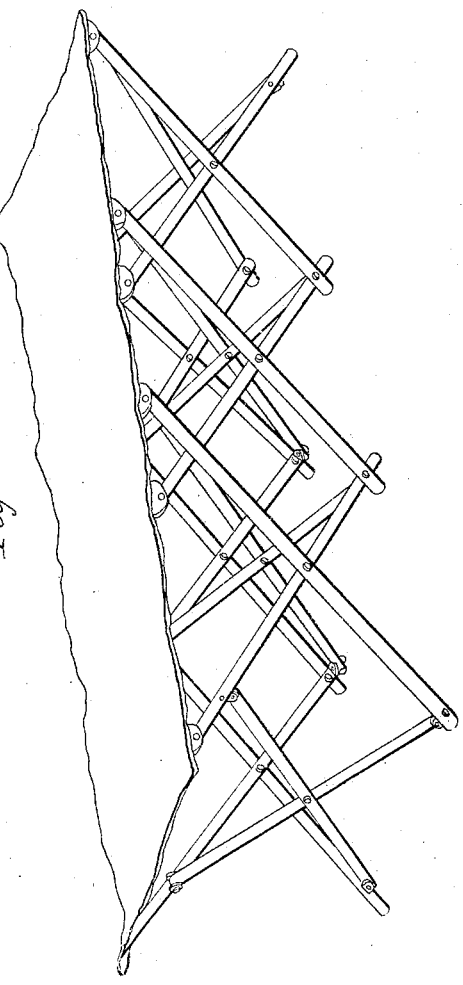
Witnesses
E. Cohen
E. D. Burt
Inventor;
Nelson Cross

United States Patent Office.

NELSON CROSS, OF NEW YORK, N. Y.

IMPROVED EXPANDING BEDSTEAD.

Specification forming part of Letters Patent No. 37,153, dated December 16, 1862.

*To all whom it may concern:*

Be it known that I, NELSON CROSS, of the city, county, and State of New York, have invented a new and Improved Extending and Contracting Cot or Lounge, suitable for house or field service; and I do hereby declare that the following is a full and exact description thereof, reference being had to the accompanying drawings or representations of the same.

The chief objection to all close folding cots in use has hitherto been that, being for the most part composed of several distinct parts which require to be separately and carefully adjusted and combined when set up, or disunited and detached when packed for storage or transportation, they not only consume a considerable amount of time in the arrangement, but the disunited parts are liable to become separated and lost. Others are found to be too weighty and bulky for convenience in the use required of them. These objections are wholly obviated by my invention, the nature of which consists in the production of a double extending and retracting cot or lounge, constructed of several parts, securely and permanently fastened together, and so proportioned and arranged relatively that by a single movement the whole is either extended to its largest proportions of length and breadth or folded compactly together without further painstaking in the adjustment.

Figure I, hereto attached, represents the said cot extended to its full proportions. The series of supports forming the two sides are composed of wood. There may be more or less of them, according to the required dimensions of length, height, and breadth. They are united in couples by a pivot-fastening at a point a few inches below the center, for reasons hereinafter explained, and the couples thus formed are united in like manner at points equidistant from the interior or middle fastening, which is placed far enough below the center to allow the upper end or arm of each slat or bar to pass beyond and above the upper pivot joint or fastening, and from separate arms, equidistant from each other, where the strain by usage is the greatest. To the side supports above described are attached a series of cross-supports of two parts, also of wood and equal in length between the pivot-eyes from end to end, to the space between the outer or extreme connection of the side supports to which, as in case of the interior supports, and corresponding to which, as in case of the two ends, they are securely attached by a kind of combined pivot and swivel-joint, so constructed as to admit of their full extension and retraction, in connection with the side supports, the whole being thus made to act harmoniously together. To the upper ends or arms of the side supports the canvas top or bed-piece is affixed by means of strong rawhide or leather pads or flaps firmly stitched to the canvas at the proper points, and buttoned, screwed, or otherwise attached to the several arms. These pads should be made of sufficient size to rest upon the extremity of the arms, thus preventing the unequal wear of the canvas from contact therewith. The cot thus constructed will be found capable of being made very light, and at the same time of sustaining a heavy weight, the combined supports acting as a complication of levers and braces, thus keeping the bed-piece sufficiently strained at every point to prevent its sagging, and holding all parts firmly and securely in place.

Fig. II represents the cot folded and packed for storage or transportation. This is done by crowding the parts together and packing the bed-piece between the space left by the projection of the side arms. This cot may be constructed of any required dimensions, and the proportions of the several parts may be varied according to the relative proportions of length and width sought to be attained.

I make no claim to the invention of an extending and retracting bed, nor do I claim as original any single contrivance used in its construction; but

What I claim as my invention is—

The combination of the side and cross levers or bars with the canvas top or bed-piece, as and for the purpose aforesaid.

NELSON CROSS.

Attest:
JOHN P. WOOD,
ANGELO BALMANNO.